US008312283B2

(12) United States Patent
Vanstone et al.

(10) Patent No.: US 8,312,283 B2
(45) Date of Patent: **\*Nov. 13, 2012**

(54) ACCELERATED SIGNATURE VERIFICATION ON AN ELLIPTIC CURVE

(75) Inventors: Scott A. Vanstone, Waterloo (CA); Donald B. Johnson, Manassas, VA (US)

(73) Assignee: Certicom Corp., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/079,116

(22) Filed: Apr. 4, 2011

(65) Prior Publication Data

US 2011/0231664 A1     Sep. 22, 2011

Related U.S. Application Data

(63) Continuation of application No. 12/216,926, filed on Jul. 11, 2008, now Pat. No. 7,930,549, which is a continuation of application No. 10/172,509, filed on Jun. 17, 2002, now Pat. No. 7,415,611, which is a continuation of application No. 08/953,637, filed on Oct. 17, 1997, now Pat. No. 6,424,712.

(51) Int. Cl.
*H04L 9/00* (2006.01)

(52) U.S. Cl. ....................................................... 713/176

(58) Field of Classification Search .................. 713/168, 713/170, 176, 180; 380/28, 30, 278, 282
See application file for complete search history.

(56) References Cited

U.S. PATENT DOCUMENTS

| | | | |
|---|---|---|---|
| 5,005,200 A | 4/1991 | Fischer | |
| 5,351,297 A | 9/1994 | Miyaji | |
| 5,442,707 A | 8/1995 | Miyaji | |
| 5,497,423 A | 3/1996 | Miyaji | |
| 5,572,454 A | 11/1996 | Lee | |
| 5,638,447 A | 6/1997 | Micali | |
| 5,761,305 A | 6/1998 | Vanstone | |
| 5,799,088 A | 8/1998 | Raike | |
| 6,157,721 A | 12/2000 | Shear | |
| 6,279,110 B1 | 8/2001 | Johnson | |
| 6,424,712 B2 | 7/2002 | Vanstone | |
| 6,526,509 B1 | 2/2003 | Horn | |
| 6,782,100 B1 | 8/2004 | Vanstone | |

FOREIGN PATENT DOCUMENTS

WO         9637064         5/1996

*Primary Examiner* — Beemnet Dada
(74) *Attorney, Agent, or Firm* — Novak Druce + Quigg LLP

(57) ABSTRACT

A public key encryption system exchanges information between a pair of correspondents. The recipient performs computations on the received data to recover the transmitted data or verify the identity of the sender. The data transferred includes supplementary information that relates to intermediate steps in the computations performed by the recipient.

27 Claims, 5 Drawing Sheets

ACCELERATED SIGNATURE VERIFICATION ON AN ELLIPTIC CURVE

CROSS-REFERENCE TO RELATED APPLICATIONS

This application is a continuation of U.S. patent application Ser. No. 12/216,926 filed on Jul. 11, 2008 which is a continuation of U.S. patent application Ser. No. 10/172,509 filed on Jun. 17, 2002, and issued on Aug. 19, 2008 as U.S. Pat. No. 7,415,611, which is a continuation of U.S. patent application Ser. No. 08/953,637 filed on Oct. 17, 1997 and issued on Jul. 23, 2002 as U.S. Pat. No. 6,424,712 all of which are incorporated herein by reference.

FIELD OF THE INVENTION

The present invention relates to public key data communication systems.

BACKGROUND OF THE INVENTION

Public key data communication systems are used to transfer information between a pair of correspondents. At least part of the information exchanged is enciphered by a predetermined mathematical operation by the sender and the recipient may perform a complementary mathematical operation to decipher the information.

A typical example of such a system is a digital signature protocol. Digital signatures are used to confirm that a message has been sent by a particular party and that the contents have not been altered during transmission.

A widely used set of signature protocols utilizes the El Gamal public key signature scheme that signs a message with the sender's private key. The recipient may then recover the message with the sender's public key.

Various protocols exist for implementing such a scheme and some have been widely used. In each case however the recipient is required to perform a computation to verify the signature. Where the recipient has adequate computing power this does not present a particular problem but where the recipient has limited computing power, such as in a "Smart card" application, the computations may introduce delays in the verification process.

Public key schemes may be implemented using one of a number of multiplicative groups in which the discrete log problem appears intractable but a particularly robust implementation is that utilizing the characteristics of points on an elliptic curve over a finite field. This implementation has the advantage that the requisite security can be obtained with relatively small orders of field compared with, for example, implementations in Zp* and therefore reduces the bandwidth required for communicating the signatures.

In a typical implementation a signature component s has the form:

$s = ae + k \pmod{n}$ where:
P is a point on the curve which is a predefined parameter of the system
k is a random integer selected as a short term private or session key, and has a corresponding short term public key R=kP
a is the long term private key of the sender and has a corresponding public key aP=Q
e is a secure hash, such as the SHA hash function, of a message m and short term public key R, and
n is the order of the curve.

The sender sends to the recipient a message including m, s, and R and the signature is verified by computing the value −(sP−eQ) which should correspond to R. If the computed values correspond then the signature is verified.

In order to perform the verification it is necessary to compute a number of point multiplications to obtain sP and eQ, each of which is computationally complex. Other protocols, such as the MQV protocols require similar computations when implemented over elliptic curves which may result in slow verification when the computing power is limited.

Typically, the underlying curve has the form y2+xy=x3+ax+b and the addition of two points having coordinates (x1, y1) and (x2,y2) results in a point (x3,y3) where:

$$x_3 = \left(\frac{y_1 \oplus y_2}{x_1 \oplus x_2}\right)^2 \oplus \frac{y_1 \oplus y_2}{x_1 \oplus x_2} \oplus x_1 \oplus x_2 \oplus a$$

$(P \neq Q)$ $$y_3 = \left(\frac{y_1 \oplus y_2}{x_1 \oplus x_2}\right) \oplus (x_1 \oplus x_3) \oplus x_3 \oplus y_1$$

$(P \neq Q)$

The doubling of a point i.e. P to 2P, is performed by adding the point to itself so that $$y_3 = \left\{x_1^2 \oplus \left(x_1 \oplus \frac{y_1}{x_1}\right)\right\} x_3 \oplus x_3$$

$$x_3 = x_1^2 \oplus \frac{b}{x_1^2}$$

It will be appreciated that successive doubling of the point Q produces values for 2Q, 22Q, 23Q . . . 2jQ and that these values may be substituted in the binary representation of the hash value e and added using the above equations to provide the value eQ. At most this would require t doublings and t point additions for at bit representation of e. Similarly the point P may be doubled successively and the values substituted in the representation of s to obtain sP. However, the generation of each of the doubled points requires the computation of both the x and y coordinates and the latter requires a further inversion. These steps are computationally complex and therefore require either significant time or computing power to perform. Substitution in the underlying curve to determine the value of y is not practical as two possible values for y will be obtained without knowing which is intended.

It is therefore an object of the present invention to provide a method and apparatus in which the above disadvantages are obviated or mitigated.

SUMMARY OF THE INVENTION

In general terms, the present invention provides a method and apparatus in which the transmitted data string is modified to include information additional to that necessary to perform the verification but that may be used to facilitate the computations involved in the verification.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
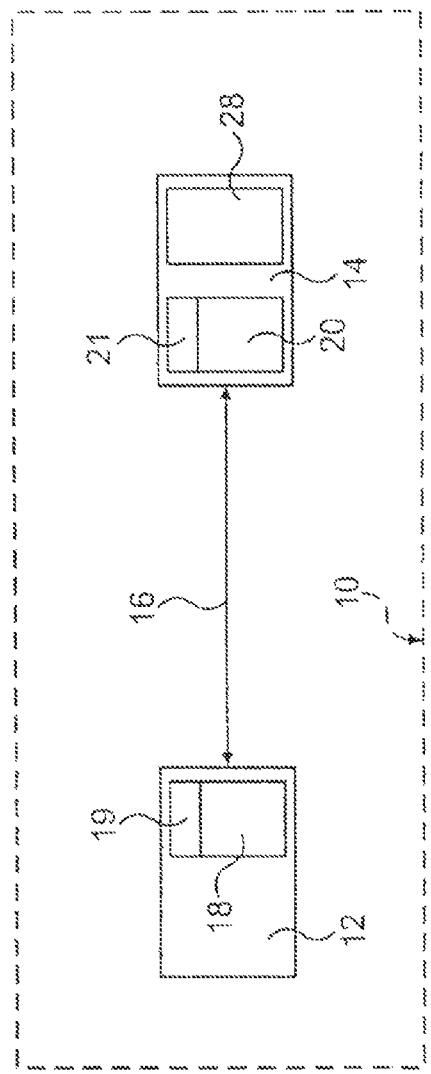
FIG. 1 is a schematic representation of a communication system.

Referring therefore to FIG. 1, a data communication system 10 includes a pair of correspondents, designated as a sender 12, and a recipient 14, who are connected by a communication channel 16. Each of the correspondents 12,14 includes an encryption unit 18,20 respectively that may process digital information and prepare it for transmission through the channel 16 as will be described below. Each of the correspondents 12,14 also includes a computational unit 19,21 respectively to perform mathematical computations related to the encryption units 18,20. The computational power of the units 19,21 will vary according to the nature of the correspondents 12,14 but for the purpose of the present disclosure, it will be assumed that the unit 19 has greater power than that of unit 21, which may in fact be a Smart card or the like.

Figure 2:
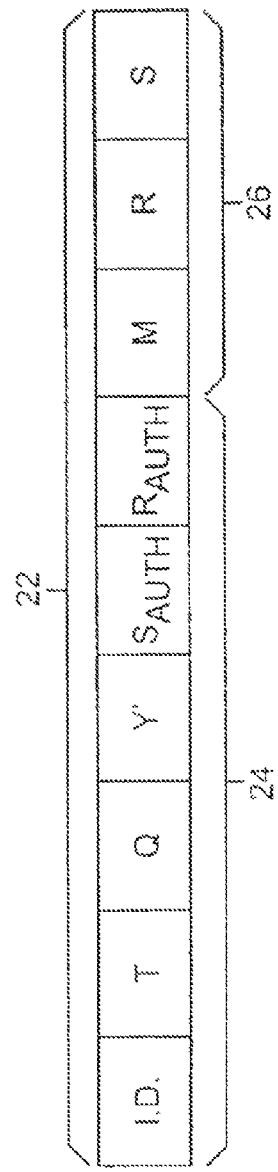
FIG. 2 is a representation of the data transmitted over the communication system in a first embodiment.

In accordance with a first embodiment, the sender 12 assembles a data string 22 shown schematically in FIG. 2. The data string 22 includes a certificate 24 from the certifying authority CA that includes the an identifier I.D. of the sender; a time stamp T; the public key Q of the sender, a string of bits y' representing supplementary information; the signature component sauth of the certifying authority; and the short term public key Rauth of the certifying authority. The data string 22 also includes a senders certificate 26 that includes the message m, the senders short term public key R and the signature component s of the sender. The string of bits y' included in the certificate 24 is obtained from the computational unit 19. The unit 19 performs at least part of the mathematical operations required to verify the signature at the recipient 14 and extracts from the computations the supplementary information y'. When assembled, the data string 22 is sent over the channel 16 to the intended recipient 18.

For simplicity it will be assumed that the signature component s of the sender 12 is of the form s=ae+k (mod n) as discussed above, although it will be understood that other signature protocols may be used. To verify the signature, sP−eQ must be computed and compared with R.

The certifying authorities signature component sauth is of similar form with its message m composed of the identifier I.D., time T and the sign bits y'.

The first step in the verification by the recipient 14 is to retrieve the value of Q and the sign bits y' from the certificate 24 using the certifying authorities public key. A hash value e' is also computed from the message m and the coordinates of the point R in the senders certificate 26. The recipient 14 is then able to perform the verification by computing sP and e'Q.

However, as noted above, the computational unit 21 has limited computing power and the computation of sP and e'Q may be time-consuming.

One or more of a number of enhancements are therefore adopted to facilitate the verification. In a first embodiment, use is made of the fact that P is a long-term system parameter.

Values corresponding to integral multiples of P may be stored at the recipient 14 in lookup tables indicated at 28 in FIG. 1. The integer corresponding to s is thus located in table 28 and the value sP retrieved to provide a first component of the verification.

The value of Q will vary from sender to sender and accordingly it is not practical to pre-compute the possible values of e'Q in a manner similar to sP. To facilitate the computation of e'Q, e' is treated as a binary representation of an integer with each bit indicative of a coefficient of successive values of 2j. The computational unit 19 at sender 12 is used to double successively the point Q so that the coordinates of 2jQ are obtained. The most significant bit of the y coordinate indicates the "sign" of the y coordinate and a string of bits representing the signs of the y coordinates of the successively doubled points is incorporated as the supplementary information y' in the certificate 24. To compute the value of e'Q at the recipient 14, the x coordinate of the point Q is successively doubled by applying the equation noted above so that the x coordinates of successive values of 2jQ are obtained. Where the binary representation of e' indicates that a value of 2jQ is required (ie. where the coefficient is "1"), the corresponding value of the y coordinate is determined by substitution in the underlying curve. Two possible values of the y coordinate are obtained and the appropriate value is determined by reference to the sign bits y' retrieved from the certificate 24. Accordingly, the computation of the y coordinate that requires an inversion is avoided.

Having obtained each pair of coordinates for the coefficients of 2jQ, they may be combined to provide the value for e'Q and combined with sP to obtain sP-e'Q. This is then compared with the recovered value of R for verification.

It will be appreciated that sP may be computed in a manner similar to e'Q with the inclusion of additional sign bits for the y coordinates of 2jP in the certificate 24. It is, however, believed to be preferable to utilize the lookup tables 28 where practical.

Figure 3:
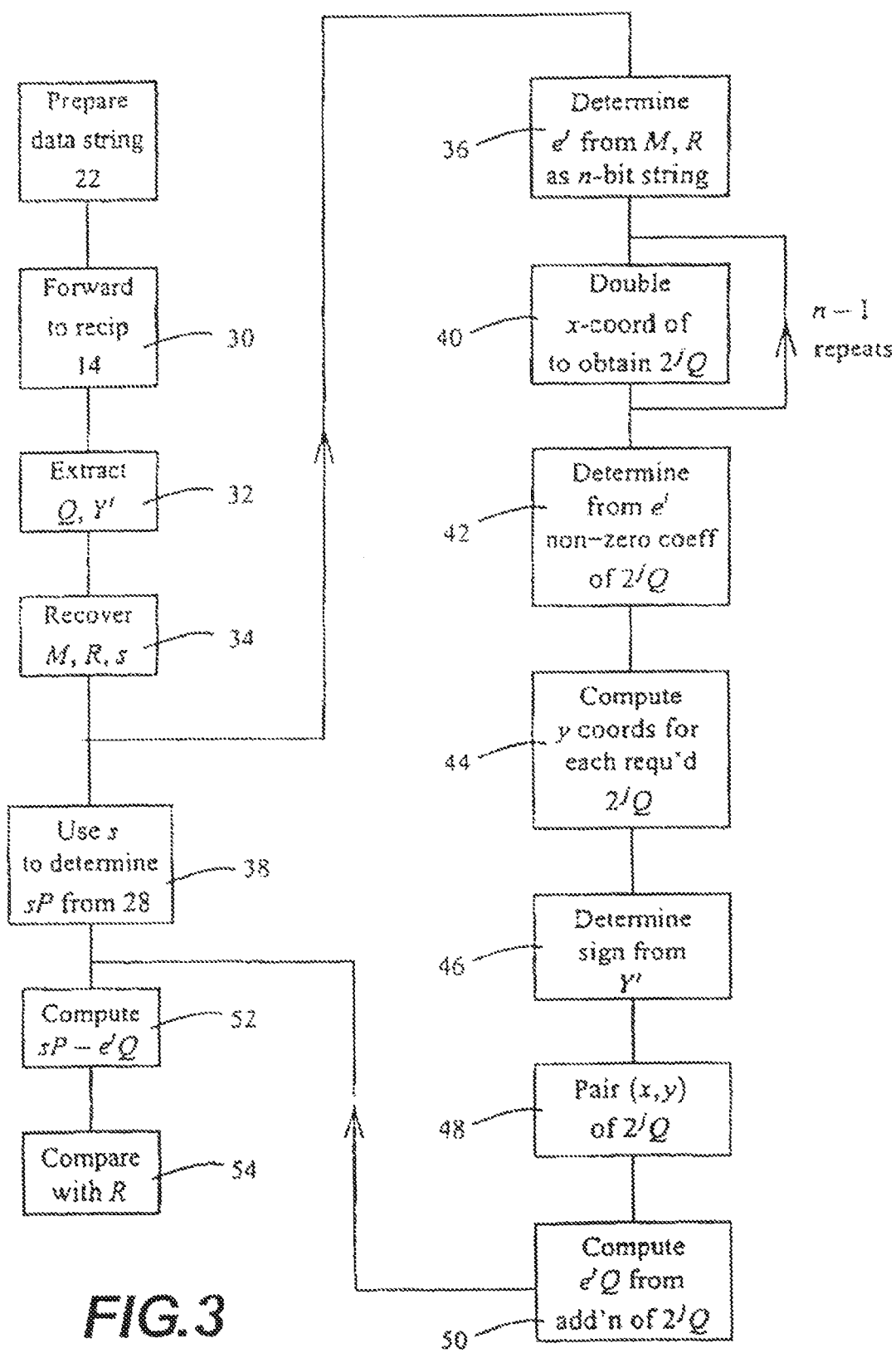
FIG. 3 is a flow chart showing the steps in verifying a signature transmitted over the system of FIG. 1 using the data format of FIG. 2.
Figure 4:
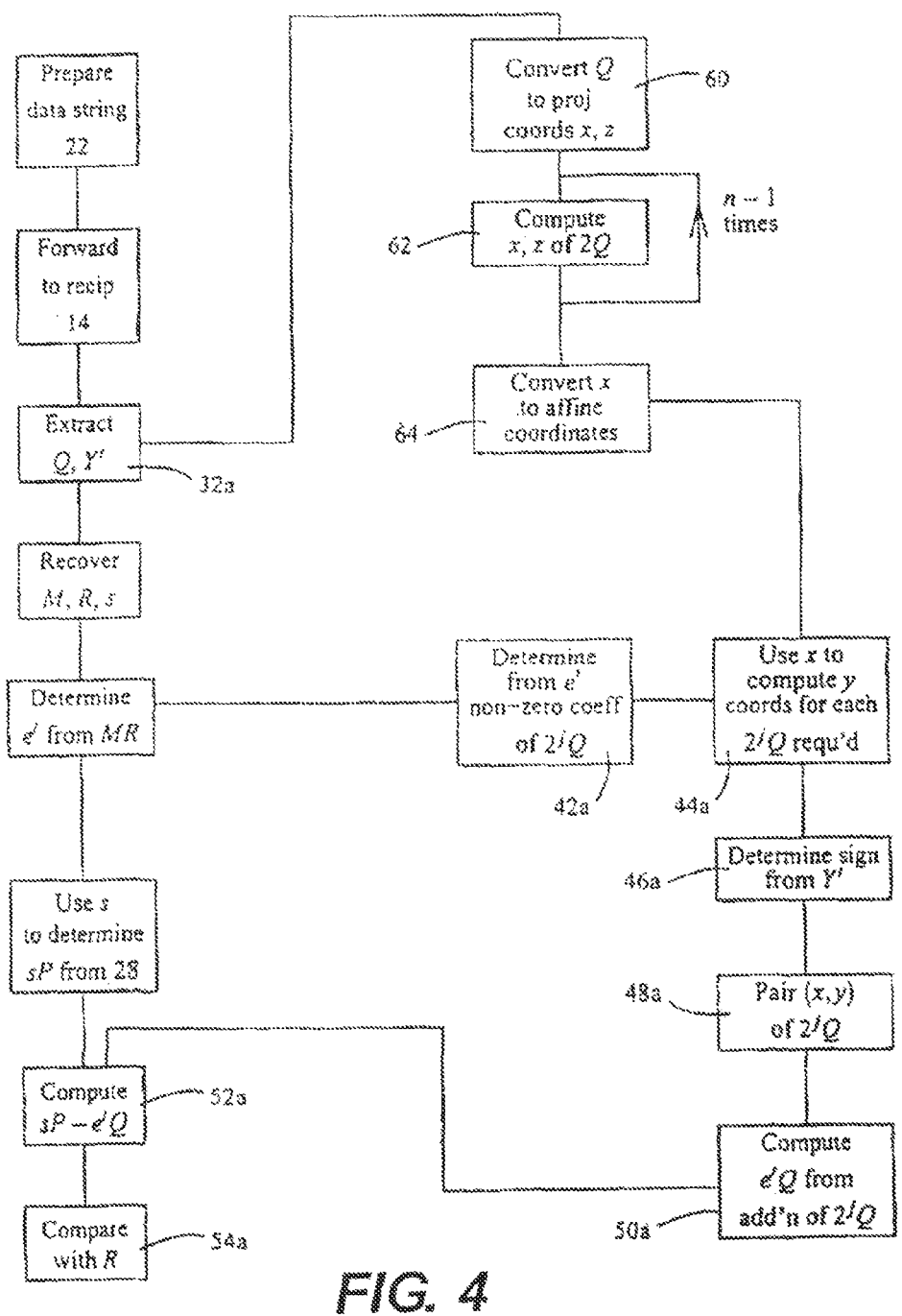
FIG. 4 is a flow chart showing the verification according to a second embodiment.

Although the above procedure reduces the computational complexities, the computation of the x coordinate still requires an inversion. Inversion is relatively costly and to facilitate the computation, the process of FIG. 3 is modified as shown in FIG. 4. Upon receipt of the data string 22, the recipient 14 recovers the affine coordinates (x, y) of the point Q and converts them into projective coordinates (x, y, z) by replacing x with x/z and y with y/z.

The value of the x and z coordinates of the point 2Q can then be calculated using the relationship in that 2(x1, y1, z1)=(x2, y2, z2) where $$x_2 = x_1^4 + z_1^4 b \text{ and}$$

$$z_2 = (x_1 z_1)^2$$

"b" is the constant associated with the underlying curve and can be chosen suitably small, i.e. one word.

Once the x and z values for 2Q have been computed, they may be used in a similar manner to obtain the values of x and z for 4Q. This may be repeated up to 2tQ so that the t sets of projective coordinates each representing the x and z coordinates of a respective one of 2jQ $0 \leq j \leq t$ are obtained.

Each of the projective x coordinates is converted into a corresponding affine coordinate by dividing the x coordinate by the z coordinate. The x coordinate of the respective values of 2jQ can then be used where necessary in the representation of e' to obtain the corresponding y coordinates by substitution in the equation representing the underlying curve. The corresponding y value is obtained by inspection of the sign bits y' included in the data string 22 which indicates the appropriate value.

With each of the coordinates obtained, the values for 2jQ can be substituted in the binary representation of e and the resultant value of eQ obtained. As the representation of e will be a string of 1's and 0's, only those values having a coefficient of 1 need be combined to simplify the computation further. The result may then be combined with the value of sP and compared with the retrieved value of R to obtain a verification.

It will be seen, therefore, that a verification is obtained without requiring an inversion at each addition to obtain the successive x coordinates which facilitates the verification process. The computation of the values of 2jQ can be readily obtained if the elliptic curve is implemented over the field GF2 when represented in normal basis representation. In this case, the computation of x14 and z14 is obtained by two cyclic shifts of the representation of the respective coordinates. After multiplying with "b", the result is XOR'd to obtain the value of the resultant x coordinate. Similarly, the value of the z coordinate can be obtained from a cyclic shift of the product of x1 and z1.

The above procedure may be modified with an increase in bandwidth by forwarding in the certificate the x coordinate of Q and each of the y coordinates of 2jQ. Some of these will of course be redundant depending on the representation of e'. However, in this manner the computation of the y coordinates is avoided but the length of the message is increased. This may be acceptable, particularly where limited computing power is available at the recipient.

As a further variant, the message could be modified to include both the x and y coordinates for each value of 2jQ with the attendant redundancy. This has the effect of minimizing the computation of eQ but does increase the message length.

Figure 5:
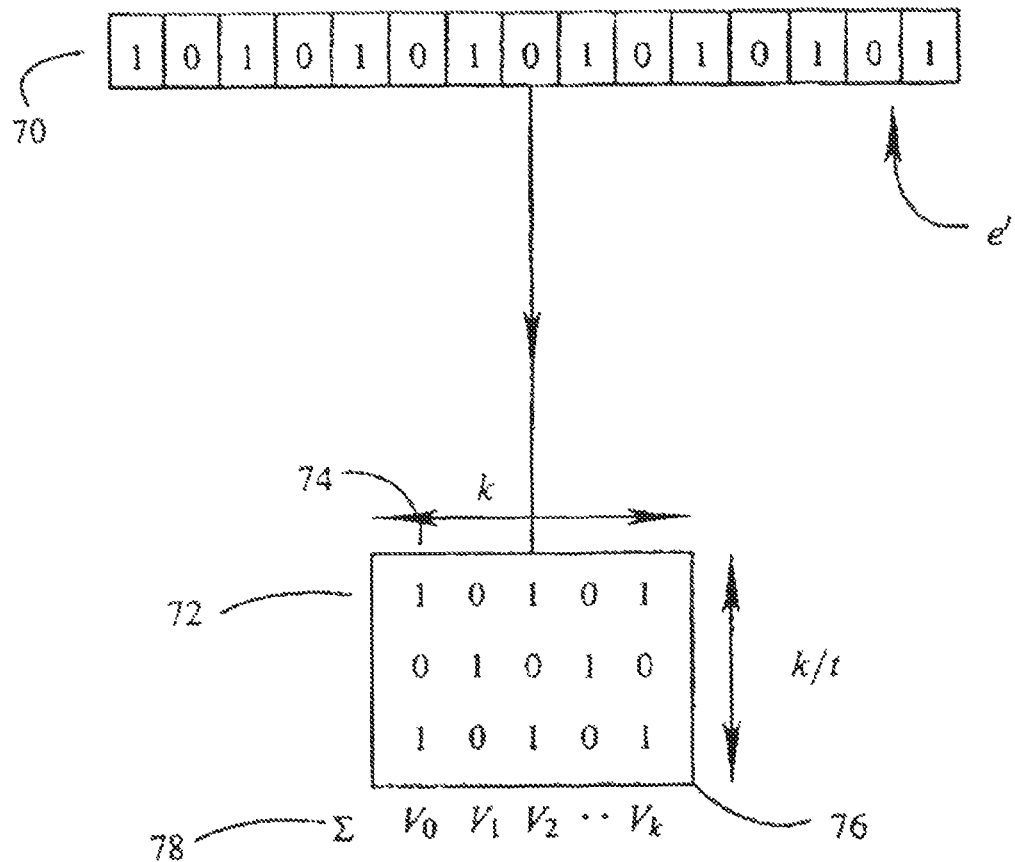
FIG. 5 is a representation of the data transmitted over the communication system in a third embodiment.
Figure 6:
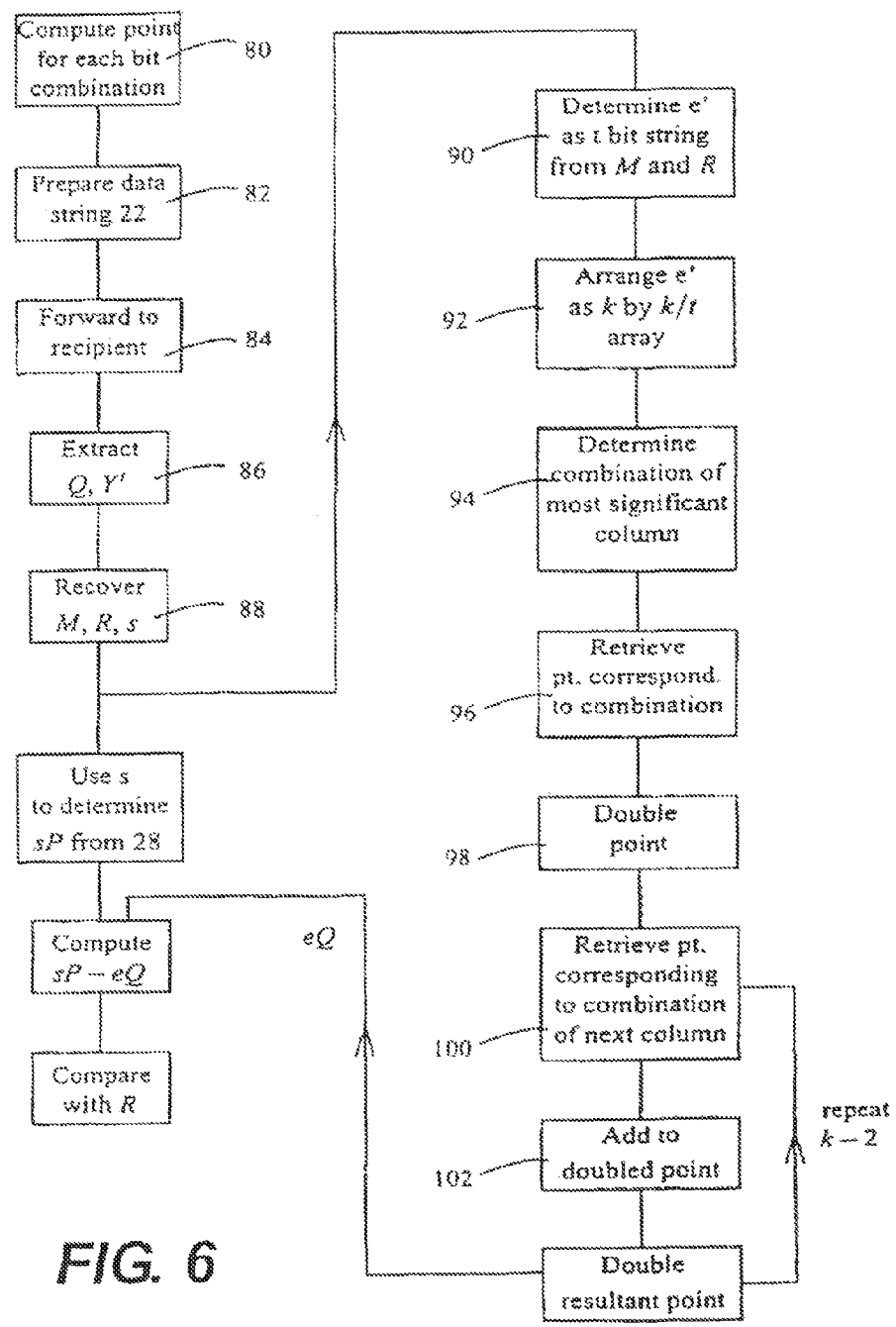
FIG. 6 is a flow chart showing the steps of verifying the signature sing the data format of FIG. 5.

A further embodiment is shown in FIGS. 5 and 6 where combing is used to facilitate the computation of eQ. If e is at bit binary number, it may be represented as a k-fold matrix having k columns and t/k rows. If the sum of each column is $V_1, V_2, V_3 \ldots V_k$, then $$e = V_1 + 2V_2 + 2^2 V_3 + \ldots + 2^{k-2} V_{k-1} + 2^{k-1} V_k, \text{ and}$$

$$eQ = V_1 Q + 2V_2 Q + 2^2 V_3 Q + \ldots + 2^{k-2} V_{k-1} Q + 2^{k-1} V_k Q$$

Each of the columns may have one of 2t/k combinations of bits. Each combination will produce a particular value $\Sigma 1, \Sigma 2, \Sigma 3$ etc. for V which has to be multiplied by the point Q to obtain the coordinates of the point 2jVjQ. The certificate 24 is thus modified to include in an ordered, retrievable manner the coordinates of the 2t/k possible points resulting from the combination of bits in the columns which have been pre-computed by the sender 12. Upon receipt, the recipient 14 extracts the message m and point R to obtain a recovered value for e. This bit string is arranged in a k-fold matrix of established configuration and the bit combination of the most significant column determined. The coordinates of the point resulting from this combination is obtained from the certificate 24, and doubled. The point corresponding to the bit combination in the next most significant column is retrieved and added to the result of the previous doubling. This is then doubled and the procedure repeated until e'Q is computed. In this way a reduced number of point additions is required, a maximum of 2k, and the bandwidth required to transmit the information is reduced. The sign bit string y' may be utilized to provide the sign bits of the y coordinates of the doubled points and added points to facilitate the computation.

In each of the above cases, the data string 22 includes additional information that may be utilized to facilitate the computation of the value eQ. In each case however the integrity of the signature is not compromised as the information could be computed from the contents of the data string as part of the verification process. The value of e with which the information is subsequently used is derived from the received data string so that tampering with the senders certificate would produce an incorrect verification. The additional information is contained within the certifying authorities certificate and forms part of the signature component and so that it cannot be substituted by an attacker without detection.

It will be seen therefore that in each embodiment the verification of a signature is facilitated by forwarding information to the recipient in addition to that required for verification and which facilitates the verification computation. It will be appreciated that while the embodiments describe the operation between a pair of correspondents, one of those correspondents could be a certifying authority or trusted intermediary. The CA receives a message from an originating correspondent, computes the supplementary information, assembles the data string and forwards the data string to the recipient. In this manner, the public key exchange between a pair of correspondents each having limited computing power may be facilitated.

The above embodiments have been described in the context of a signature verification protocol. However, the techniques may be utilized on other public key operations such as key agreement or key transport protocols. Examples of these protocols are the MQV protocols or protocols set out in IEEE P 21363 draft standard. In such protocols, it is typically necessary to generate a scaled multiple of a point on the curve, i.e. kP where k is an integer and P is a point on the curve. Accordingly, the information transferred between correspondents may be modified to include supplementary information to facilitate the computations involved in such protocols.

The invention claimed is:

1. A method of facilitating cryptographic processing in a data communication system, the method comprising a processor of a first device in the data communication system:
    determining, via the processor, for a first set of information sufficient to perform complementary cryptographic processing of cryptographically processed data, additional information supplementary to that of the first set of information, the additional information facilitating the computation of at least one intermediate operation involved in performing the complementary cryptographic processing of the cryptographically processed data;
    wherein the complementary cryptographic processing comprising verification of a signature of the data; and
    making the additional information available to a second device in the data communication system to enable the second device to use the additional information in the at least one intermediate operation to facilitate the complementary cryptographic processing of the cryptographically processed data.

2. The method of claim 1, comprising the processor transferring the cryptographically processed data to the second device.

3. The method of claim 2, comprising the processor incorporating the additional information in a data communication comprising the cryptographically processed data.

4. The method of claim 3, the data communication comprising a message.

5. The method of claim 1, the additional information comprising data pertaining to coordinates of one or more points on an elliptic curve used in the complementary cryptographic processing.

6. The method of claim 5, the data pertaining to the coordinates of the one or more points on the elliptic curve being obtained by successively doubling a designated point on the elliptic curve.

7. The method of claim 6, the additional information comprising an indication as to which of a pair of possible values resulting from the at least one intermediate operation is an intended value.

8. The method of claim 6, the additional information comprising one or more of a pair of coordinates for each of the one or more points on the elliptic curve.

9. The method of claim 1, the cryptographic processing and complementary cryptographic processing comprising at least one public key cryptographic operation.

10. A non-transitory computer readable medium comprising computer executable instructions for facilitating cryptographic processing in a data communication system, the computer executable instructions comprising instructions for a processor of a first device in the data communication system:
   determining, for a first set of information sufficient to perform complementary cryptographic processing of cryptographically processed data, additional information supplementary to that of the first set of information, the additional information facilitating the computation of at least one intermediate operation involved in performing the complementary cryptographic processing of the cryptographically processed data;
   wherein the complementary cryptographic processing comprising verification of a signature of the data; and
   making the additional information available to a second device in the data communication system to enable the second device to use the additional information in the at least one intermediate operation to facilitate the complementary cryptographic processing of the cryptographically processed data.

11. The non-transitory computer readable medium of claim 10, comprising instructions for the processor transferring the cryptographically processed data to the second device.

12. The non-transitory computer readable medium of claim 11, comprising instructions for the processor incorporating the additional information in a data communication comprising the cryptographically processed data.

13. The non-transitory computer readable medium of claim 12, the data communication comprising a message.

14. The non-transitory computer readable medium of claim 10, the additional information comprising data pertaining to coordinates of one or more points on an elliptic curve used in the complementary cryptographic processing.

15. The non-transitory computer readable medium of claim 14, the data pertaining to the coordinates of the one or more points on the elliptic curve being obtained by successively doubling a designated point on the elliptic curve.

16. The non-transitory computer readable medium of claim 15, the additional information comprising an indication as to which of a pair of possible values resulting from the at least one intermediate operation is an intended value.

17. The non-transitory computer readable medium of claim 15, the additional information comprising one or more of a pair of coordinates for each of the one or more points on the elliptic curve.

18. The non-transitory computer readable medium of claim 10, the cryptographic processing and complementary cryptographic processing comprising at least one public key cryptographic operation.

19. A first device comprising a processor operable to facilitate cryptographic processing in a data communication system, the first device configured for operating the processor to:
   determine, via the processor, for a first set of information sufficient to perform complementary cryptographic processing of cryptographically processed data, additional information supplementary to that of the first set of information, the additional information facilitating the computation of at least one intermediate operation involved in performing the complementary cryptographic processing of the cryptographically processed data;
   wherein the complementary cryptographic processing comprising verification of a signature of the data; and
   make the additional information available to a second device in the data communication system to enable the second device to use the additional information in the at least one intermediate operation to facilitate the complementary cryptographic processing of the cryptographically processed data.

20. The device of claim 19, further configured for operating the processor to transfer the cryptographically processed data to the second device.

21. The device of claim 20, further configured for operating the processor to incorporate the additional information in a data communication comprising the cryptographically processed data.

22. The device of claim 21, the data communication comprising a message.

23. The device of claim 19, the additional information comprising data pertaining to coordinates of one or more points on an elliptic curve used in the complementary cryptographic processing.

24. The device of claim 23, the data pertaining to the coordinates of the one or more points on the elliptic curve being obtained by successively doubling a designated point on the elliptic curve.

25. The device of claim 24, the additional information comprising an indication as to which of a pair of possible values resulting from the at least one intermediate operation is an intended value.

26. The device of claim 24, the additional information comprising one or more of a pair of coordinates for each of the one or more points on the elliptic curve.

27. The device of claim 19, the cryptographic processing and complementary cryptographic processing comprising at least one public key cryptographic operation.

* * * * *